(12) United States Patent
Pularikkal et al.

(10) Patent No.: US 9,420,619 B2
(45) Date of Patent: Aug. 16, 2016

(54) DYNAMIC QUALITY OF SERVICE FOR WIRELESS SUBSCRIBERS ON A NETWORK

(71) Applicants: Gangadharan Byju Pularikkal, Morrisville, NC (US); Madhusudan Nanjanagud, San Jose, CA (US)

(72) Inventors: Gangadharan Byju Pularikkal, Morrisville, NC (US); Madhusudan Nanjanagud, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 263 days.

(21) Appl. No.: 13/706,405

(22) Filed: Dec. 6, 2012

(65) Prior Publication Data

US 2014/0161047 A1    Jun. 12, 2014

(51) Int. Cl.
*H04W 72/08* (2009.01)
*H04W 76/02* (2009.01)
*H04W 84/12* (2009.01)

(52) U.S. Cl.
CPC ............ *H04W 76/025* (2013.01); *H04W 84/12* (2013.01)

(58) Field of Classification Search
CPC ................. H04L 12/4641; H04L 41/0816
USPC .................. 370/252, 329, 338, 389
See application file for complete search history.

(56) References Cited

U.S. PATENT DOCUMENTS

| 8,089,963 | B2 | 1/2012 | Melman et al. | |
| 2008/0304485 | A1* | 12/2008 | Sinha et al. | 370/392 |
| 2008/0318557 | A1* | 12/2008 | Poulson et al. | 455/414.1 |
| 2011/0110266 | A1* | 5/2011 | Li | H04L 47/2491 370/253 |
| 2012/0275303 | A1 | 11/2012 | Wang | |
| 2013/0329557 | A1* | 12/2013 | Petry et al. | 370/235 |
| 2014/0056130 | A1* | 2/2014 | Grayson et al. | 370/230 |
| 2014/0092723 | A1* | 4/2014 | Murphy | H04L 41/00 370/221 |

OTHER PUBLICATIONS

P. Calhoun et al., "Control and Provisioning of Wireless Access Points (CAPWAP) Protocol Specification," RFC 5415, http://tools.ietf.org/html/rfc5415, (156 pages), Mar. 2009, Downloaded Dec. 3, 2012.
P. Calhoun, et al., Control and Provisioning of Wireless Access Points (CAPWAP) Protocol Binding for IEEE 802.11, RFC 5416, http://tolls.ietf.org/html/rfc5416, (77 pages), Mar. 2009, Downloaded Dec. 3, 2012.

* cited by examiner

*Primary Examiner* — Redentor Pasia
*Assistant Examiner* — Peter Mak
(74) *Attorney, Agent, or Firm* — Baker Botts L.L.P.

(57) ABSTRACT

A system includes an interface operable to receive a request to initiate a first connection between a subscriber and a wireless access point using a first network protocol. The system further includes a processor operable to determine whether the subscriber has enhanced Quality of Service (QoS) privileges. In response to determining the subscriber has enhanced QoS privileges, the processor is operable to associate a first port number with traffic associated with the subscriber on a second connection using a second network protocol. In response to determining the subscriber does not have enhanced QoS privileges, the processor is operable to associate a second port number with traffic associated with the subscriber on the second connection using the second network protocol.

18 Claims, 3 Drawing Sheets

DYNAMIC QUALITY OF SERVICE FOR WIRELESS SUBSCRIBERS ON A NETWORK

TECHNICAL FIELD

The present disclosure relates generally to the provision of Quality of Service (QoS) on a network, and more specifically to dynamic provision of QoS for wireless subscribers on a service provider network.

BACKGROUND

Current service provider networks do not have an end to end Quality of Service (QoS) mechanism to provide an enhanced QoS service on a per subscriber basis. While it is easy to provide QoS over service provider core networks, QoS implementation is more challenging in centralized service provider network models where the user traffic gets tunneled between a wireless access point (WAP) and a central wireless access controller (WAC). Because the tunneling removes the QoS visibility of the subscriber's traffic characteristics along the path of the tunnel, devices on the path may not be able to implement per subscriber QoS services.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Overview

A system includes an interface operable to receive a request to initiate a first connection between a subscriber and a wireless access point using a first network protocol. The system further includes a processor operable to determine whether the subscriber has enhanced Quality of Service (QoS) privileges. In response to determining the subscriber has enhanced QoS privileges, the processor is operable to associate a first port number with traffic associated with the subscriber on a second connection using a second network protocol. In response to determining the subscriber does not have enhanced QoS privileges, the processor is operable to associate a second port number with traffic associated with the subscriber on the second connection using the second network protocol.

Embodiments of the present disclosure may provide numerous technical advantages. For example, certain embodiments of the present disclosure may allow for the provision of QoS services for subscribers over a wireless LAN network. As another example, the QoS services may be provided on a per subscriber basis. Other technical advantages of the present disclosure will be readily apparent to one skilled in the art from the following figures, descriptions, and claims. Moreover, while specific advantages have been enumerated above, various embodiments may include all, some, or none of the enumerated advantages.

Description of Example Embodiments

Figure 1A:
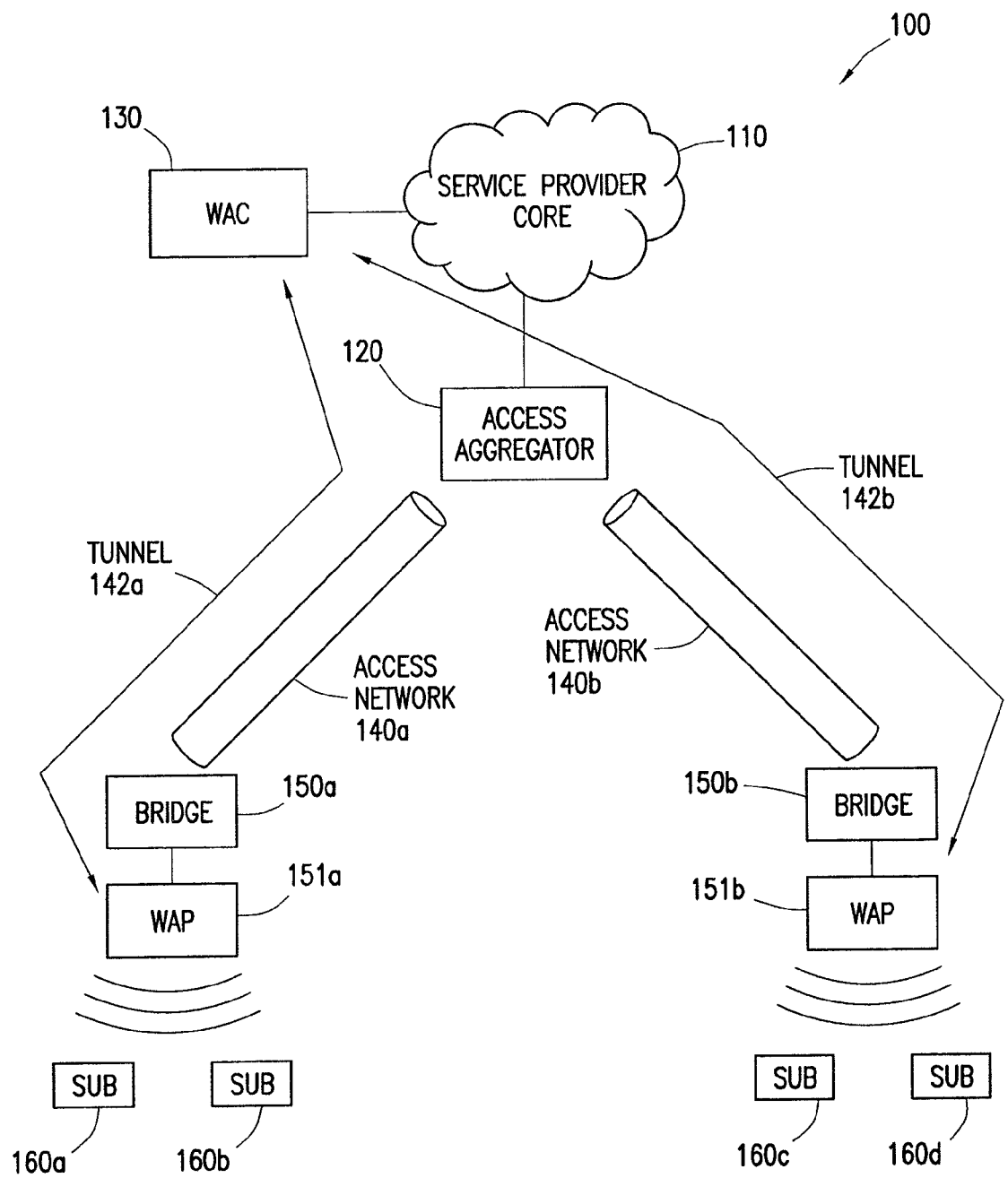
FIG. 1A illustrates a service provider network that includes a service provider core network, an access aggregator, a wireless access controller, an access network, bridges, wireless access points, and subscribers in accordance with particular embodiments.
Figure 1B:
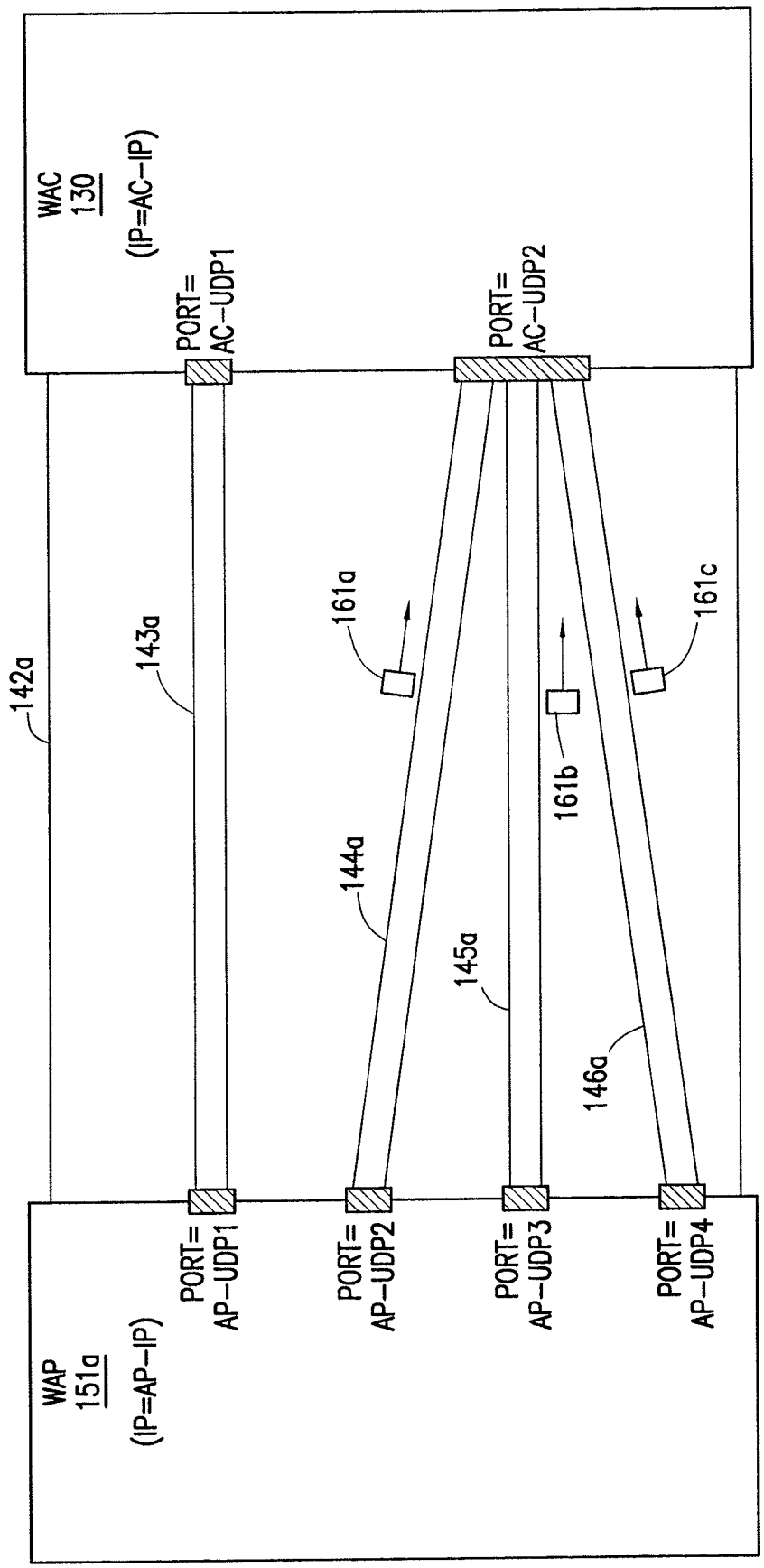
FIG. 1B illustrates an example tunnel between a wireless access point and a wireless access controller of FIG. 1A in accordance with particular embodiments.
Figure 2:
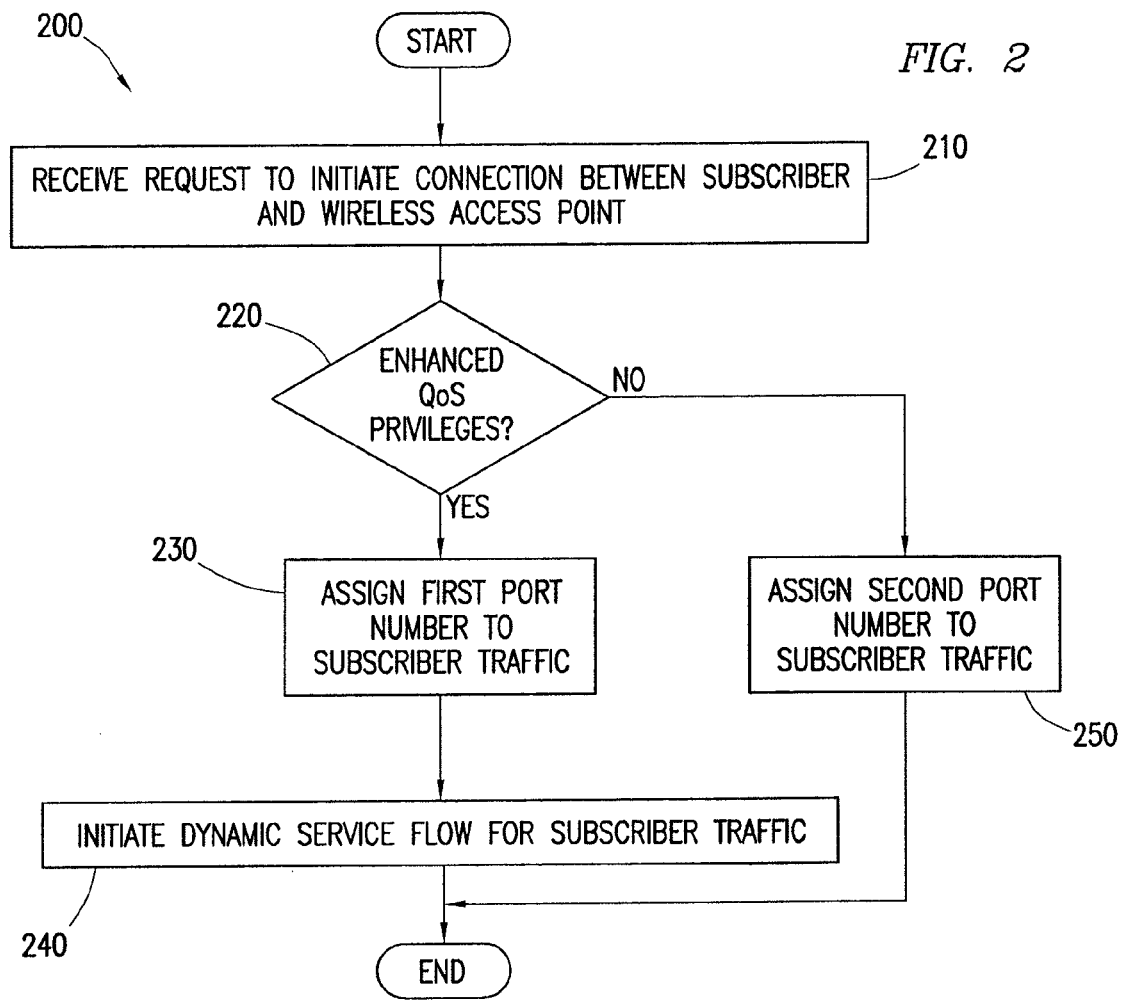
FIG. 2 illustrates an example method for providing Quality of Service on a per subscriber basis in the service provider network of FIGS. 1A-1B in accordance with particular embodiments.
Figure 3:
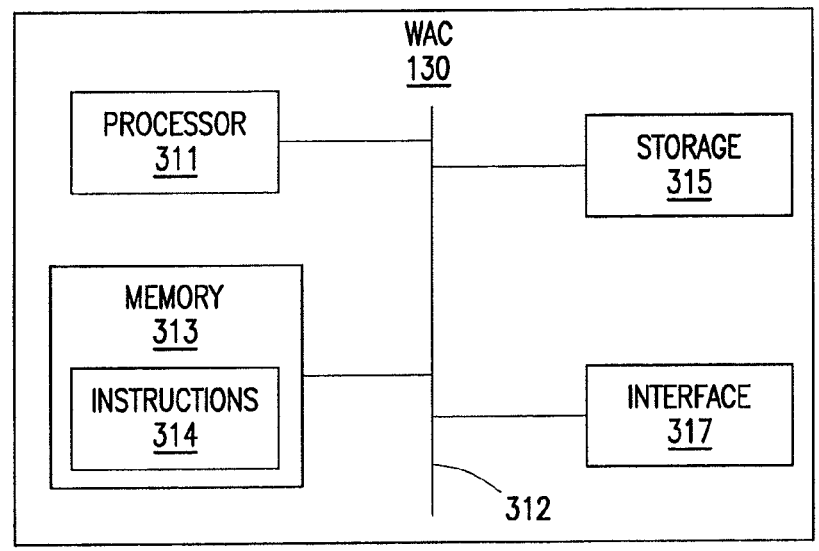
FIG. 3 illustrates an example architecture of the wireless access controller of FIGS. 1A-1B that may be used in accordance with particular embodiments.

Embodiments of the present disclosure are best understood by referring to FIGS. 1 through 3 of the drawings, like numerals being used for like and corresponding parts of the various drawings.

FIG. 1A illustrates a service provider network 100 that includes a service provider core network 110, an access aggregator 120, a wireless access controller (WAC) 130, access networks 140, bridges 150, wireless access points (WAP) 151, and subscribers 160 in accordance with particular embodiments of the present disclosure. Service provider core network 110 may be any interconnecting system operable to connect a plurality of nodes in a service provider network, and may include all or a portion of a local, regional, or global communication or computer network such as the Internet, a wireline or wireless network, an enterprise internet, or any other suitable communication link, including combinations thereof. Access aggregator 120 may be any system termination device, including a cable modem termination system (CMTS) device, operable to connect multiple subscribers in a an access network (e.g., access networks 140) to a core network (e.g., service provider core network 110). WAC 130 may be any network device operable to control one or more wireless access points (e.g., WAPs 151) of a service provider network. Access networks 140 may refer to any interconnecting system operable to connect an access aggregator (e.g., access aggregator 120) to one or more wireless access points (e.g., WAPs 151). WAPs 151 may be any network device operable to allow wireless devices (e.g., those used by subscribers 160) to connect to a wired network (e.g. service provider network 100). Bridge 150 may be any network device operable to bridge communications between WAP 151 and access network 140, and may include a cable modem. In certain embodiments, WAP 151 and bridge 150 may be included in the same device, while other embodiments may include separate WAPs 151 and bridges 150 as shown in FIG. 1A. In certain embodiments, WAC 130 may be operable to communicate with WAPs 151 over tunnels 142 traversing service provider core network 110 via access aggregator 120.

Today, most service provider networks do not have the ability to provide end to end Quality of Service (QoS) on a per subscriber basis. Thus, services such as managed Voice over IP (VoIP), video on demand, interactive gaming applications, or tiered service level offerings for high speed Internet access may not be available to users on wireless networks. While it is easy to provide QoS over service provider core networks, QoS implementation is more challenging in centralized service provider network models where the user traffic gets tunneled between a wireless access point (e.g., WAP 151) and a central wireless access controller (e.g., WAC 130) that controls the various wireless access points in the network.

Accordingly, in particular embodiments of the present disclosure, a mechanism may be provided to tag the different traffic flows carried in a tunnel (e.g., tunnel 142) across the service provider core network 110 so that the individual traffic flows can be mapped to different service flows in an access network. By doing this, a dynamic service flow may be initiated for a specific subscriber depending on QoS privileges of the subscriber. A traffic flow may refer to something as general as all the traffic originated from, or destined for, a particular subscriber address (e.g., a MAC address), or may refer to something as specific as a flow represented by the quartet of source IP address, source port address, destination IP address, and destination port address. A dynamic service flow may refer to a traffic flow that is provisioned and/or activated on-the-fly by an access controller, such as WAC 130, as opposed to a traffic flow that is provisioned and/or activated at the time a subscriber device is first registered to a wireless access point (i.e., static service flow).

FIG. 1B illustrates an example tunnel 142*a* between WAP 151*a* and WAC 130 of FIG. 1A in accordance with particular embodiments of the present disclosure. In present systems, such as those utilizing the CAPWAP (control and provisioning of wireless access points) protocol, traffic flows in a service provider network such as service provider network 100 may be carried over tunnels comprising channels through service provider core network 110. In such systems, a control channel (e.g., control channel 143*a*) and a data channel (e.g., data channel 144*a*) may be setup to carry traffic flows in service provider network (e.g., service provider network 100). The control channel may carry traffic regarding network control operations (such as used for provisioning and management of the wireless access points) and may be defined by ports AP-UDP1 on the WAP side and AC-UDP1 on the WAC side, while the data channel may carry the subscriber data traffic and may be defined by ports AP-UDP2 on the WAP side and AC-UDP2 on the WAC side.

However, the use of a single data tunnel to carry traffic flows corresponding to multiple end subscribers poses significant challenges to apply per subscriber QoS on the interconnecting devices which make up the Layer-2/Layer-3 network between the wireless access point & access controller. For instance, referring to FIG. 1A, although subscriber 160*a* may have QoS privileges on service provider network 100 and subscriber 160*b* may not, data traffic for both subscribers will be carried across data channel 144*a*. This causes WAC 130 and other network devices to lose visibility of each subscriber's data traffic, preventing such devices from providing services such as QoS. The issue of QoS is even more prominent when the backhaul used for connecting wireless access points to the access controllers is a DOCSIS (data over cable service interface specification) Access Network, since service flow-based QoS in DOCSIS is implemented using different levels of QoS for different traffic flows.

In some systems, the architecture of the service provider network may be based upon the CAPWAP protocol as described in RFC 5415, under which tunnels are formed between the wireless access point and the associated access controller (e.g., tunnels 142 between WAP 151 and WAC 130). The CAPWAP control channel may be a bi-directional flow using a transport-layer protocol such as UDP or UDP-Lite over which CAPWAP control packets may be sent and received. Similarly, the CAPWAP data channel may be a bi-directional flow using a transport-layer protocol such as UDP or UDP-Lite over which CAPWAP data packets are sent and received. As discussed above, a CAPWAP data channel between a wireless access point and its associated access controller masks the visibility of the individual traffic flows from different subscribers carried in the same tunnel, making QoS implementation on a per subscriber basis difficult.

Accordingly, in particular embodiments of the present disclosure, an additional port and channel may be created on for each subscriber with QoS privileges. For instance, in certain embodiments, WAP 151*a* may first associate itself with WAC 130 and create tunnel 142*a*. Tunnel 142*a* may include both control channel 143*a* and data channel 144*a*. Control channel 143*a* may be uniquely identified by the quartet comprising the IP address at WAP 151 (AP-IP), a UDP port number selected by WAP 151 (AP-UDP1) on the WAP-side, the IP address at WAC 130 (AC-IP), and the UDP address AC-UDP1 on the WAC-side. Likewise, data channel 144*a* may be uniquely identified by the IP address at WAP 151 (AP-IP), a different UDP port number selected by WAP 151 (AP-UDP2), the IP address at WAC 130 (AC-IP), and UDP port number AC-UDP2 at WAC 130. In embodiments using the CAPWAP protocol, the port address AC-UDP1 may be well-known UDP port number 5246, while port address AC-UDP2 may be well-known UDP port address 5247.

When a subscriber without enhanced QoS privileges (e.g., subscriber 160*a*) connects to WAP 151*a*, it may use the above quartets for communication through tunnel 142*a*. That is, its data packets (e.g., packet 161*a*) in the upstream direction will be destined for IP address AC-IP and AC-UDP2 port address with source IP address AP-IP and source port address AP-UDP2. However, when a subscriber with enhanced QoS privileges (e.g., subscriber 160*b*) connects to WAP 151*a*, WAP 151*a* may recognize such privileges and communicate as much to WAC 130. WAC 130 may then command WAP 151 to use a unique UDP source port (e.g., port AP-UDP3 in FIG. 1B) for traffic flows having enhanced QoS privileges. This creates an additional data channel 145*a* defined by ports AP-UDP3 on the WAP side and AC-UDP2 on the WAC side. By creating this new channel, data packets 161*b* from subscriber 160*b* (with QoS privileges) may be distinguished from data packets 161*a* coming from subscriber 160*a* (without QoS privileges) by WAC 130 and other network devices. If an additional subscriber with enhanced QoS privileges connects to WAP 151*a*, WAC 130 may command WAP 151*a* to create another data channel 146*a* defined by ports AP-UDP4 on the WAP side and AC-UDP2 on the WAC side. This additional channel may then carry data packets 161 c from the additional subscriber with enhanced privileges, and such traffic may be distinguished from data packets 161*a* and 161*b* coming from subscribers 160*a* and 160*b*, respectively.

Although only one additional port and channel is illustrated, additional ports and channels may be created for other subscribers with QoS privileges. Likewise, although FIG. 1B illustrates channels 143*a*-146*a* in tunnel 142*a*, the same concepts may be applied to tunnel 142*b* as well.

FIG. 2 illustrates an example method 200 for providing QoS on a per subscriber basis in service provider network 100 of FIG. 1 in accordance with particular embodiments of the present disclosure. The method begins at step 210, where an access controller receives a request to initiate a connection between a subscriber and a wireless access point. The connection between the subscriber and the wireless access point may be provided using a wireless network protocol, such as an IEEE 802.11 standard (including IEEE 802.11a, IEEE 802.11b, IEEE 802.11g, and IEEE 802.11n) or any suitable network protocol for connecting nodes via a wireless connection. Next, at step 220, the access controller determines whether the subscriber has enhanced QoS privileges on the service provider network. For instance, it may be determined that subscribers 160*b* and 160*d* each have enhanced QoS privileges, while subscribers 160*a* and 160*c* do not have such privileges.

If the access controller determines that the subscriber has enhanced QoS privileges, the method continues to step 230, where a first port number is determined for traffic associated with the subscriber on a second connection. For example, referring to FIG. 1B, UDP port AP-UDP3 may be assigned to data traffic associated with a first subscriber with enhanced privileges and UDP port AP-UDP4 may be assigned to data traffic associated with a second subscriber with enhanced privileges. In some embodiments, the second connection may include a DOCSIS network connection. In particular embodiments, the second network connection may utilize a tunneling protocol, such as the CAPWAP protocol described above. At step 240, the access controller initiates a dynamic service flow for the subscriber's traffic on the second connection using the first port number.

If, however, the access controller determines that the subscriber does not have enhanced QoS privileges, the method continues to step 250 where a second port number is determined for traffic associated with the subscriber on the second connection. For example, referring to FIG. 1B, UDP port AP-UDP2 may be assigned to data traffic associated with the subscribers with enhanced privileges. Accordingly, the access controller and other devices may be able to distinguish between traffic flows with enhanced QoS privileges and traffic flows without such privileges, and therefore provide QoS services on a per subscriber basis.

FIG. 3 illustrates an example architecture of WAC 130 of FIG. 1 that may be used in accordance with particular embodiments. WAC 130 may include its own respective processor 311, memory 313, instructions 314, storage 315, interface 317, and bus 312. In particular embodiments, other components of FIG. 1, such as WAPs 151 and/or access aggregator 120, may include components similar to those of WAC 130. These components may work together to perform one or more steps of one or more methods (e.g. the method of FIG. 2) and provide the functionality described herein. For example, in particular embodiments, instructions 314 in memory 313 may be executed on processor 311 in order to dynamically provide QoS for wireless subscribers based on requests received by interface 317. In certain embodiments, instructions 314 may reside in storage 315 instead of, or in addition to, memory 313.

Processor 311 may be a microprocessor, controller, application specific integrated circuit (ASIC), or any other suitable computing device operable to provide, either alone or in conjunction with other components (e.g., memory 313 and instructions 314) QoS provisioning functionality. Such functionality may include determining that a subscriber has enhanced Quality of Service (QoS) privileges and associating a port number with traffic associated with the subscriber based on the privileges, as discussed herein. In particular embodiments, processor 311 may include hardware for executing instructions 314, such as those making up a computer program or application. As an example and not by way of limitation, to execute instructions 314, processor 311 may retrieve (or fetch) instructions 314 from an internal register, an internal cache, memory 313 or storage 315; decode and execute them; and then write one or more results to an internal register, an internal cache, memory 313, or storage 315.

Memory 313 may be any form of volatile or non-volatile memory including, without limitation, magnetic media, optical media, random access memory (RAM), read-only memory (ROM), flash memory, removable media, or any other suitable local or remote memory component or components. Memory 313 may store any suitable data or information utilized by WAC 130, including software (e.g., instructions 314) embedded in a computer readable medium, and/or encoded logic incorporated in hardware or otherwise stored (e.g., firmware). In particular embodiments, memory 313 may include main memory for storing instructions 314 for processor 311 to execute or data for processor 311 to operate on. In particular embodiments, one or more memory management units (MMUs) may reside between processor 311 and memory 313 and facilitate accesses to memory 313 requested by processor 311.

Storage 315 may include mass storage for data or instructions (e.g., instructions 314). As an example and not by way of limitation, storage 315 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 315 may include removable or non-removable (or fixed) media, where appropriate. Storage 315 may be internal or external to WAC 130 (and/or remote transceiver 220), where appropriate. In some embodiments, instructions 314 may be encoded in storage 315 in addition to, in lieu of, memory 313.

Interface 317 may include hardware, encoded software, or both providing one or more interfaces for communication (such as, for example, packet-based communication) between WAC 130 and any other computer systems on service provider core network 110. As an example, and not by way of limitation, interface 317 may include a network interface controller (NIC) or network adapter for communicating with an Ethernet or other wire-based network and/or a wireless NIC (WNIC) or wireless adapter for communicating with a wireless network. Interface 317 may include one or more connectors for communicating traffic (e.g., IP packets) via a bridge card. Depending on the embodiment, interface 317 may be any type of interface suitable for any type of network in which WAC 130 is used. In some embodiments, interface 317 may include one or more interfaces for one or more I/O devices. One or more of these I/O devices may enable communication between a person and WAC 130. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 312 may include any combination of hardware, software embedded in a computer readable medium, and/or encoded logic incorporated in hardware or otherwise stored (e.g., firmware) to couple components of WAC 130 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 312 may include any number, type, and/or configuration of buses 312, where appropriate. In particular embodiments, one or more buses 312 (which may each include an address bus and a data bus) may couple processor 311 to memory 313. Bus 312 may include one or more memory buses.

Although various implementations and features are discussed with respect to multiple embodiments, it should be understood that such implementations and features may be combined in various embodiments. For example, features and functionality discussed with respect to a particular figure, such as FIGS. 1A and 1B, may be used in connection with features and functionality discussed with respect to another such figure, such as FIG. 2, according to operational needs or desires.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A system, comprising:
   a memory comprising instructions;
   an interface operable to receive, at a wireless access controller (WAC), access information in response to a request to initiate a first connection between a subscriber and a wireless access point (WAP) using a first network protocol; and
   a processor operable, when executing the instructions, to:
      determine, at the WAC based on the access information, whether the subscriber has enhanced Quality of Service (QoS) privileges;
      in response to determining the subscriber has enhanced QoS privileges, assign subscriber traffic to a second connection between the WAP and the WAC, the second connection using a first pair of port numbers and using a second network protocol different from the first network protocol, wherein the WAC commands the WAP to use the first pair of port numbers to dynamically create the second connection;
      in response to determining the subscriber does not have enhanced QoS privileges, assign subscriber traffic to a third connection, the third connection using a second pair of port numbers and the second network protocol; and
      initiate a dynamic service flow based on the pair of port numbers associated with the subscriber traffic, wherein the dynamic service flow is defined by a source network address, a source port address, a destination network address, and a destination port address.

2. The system of claim 1, wherein the second connection includes a data over cable service interface specification (DOCSIS) network.

3. The system of claim 1, wherein the second network protocol utilizes a tunneling protocol.

4. The system of claim 3, wherein the tunneling protocol is the control and provisioning of wireless access points (CAPWAP) protocol.

5. The system of claim 1, wherein the first network protocol is selected from the group consisting of IEEE 802.11a, IEEE 802.11b, IEEE 802.11g, and IEEE 802.11n.

6. The system of claim 1, wherein the first pair of port numbers and the second pair of port numbers each comprise user datagram protocol (UDP) ports associated with the WAP.

7. A method, comprising:
   receiving, at a wireless access controller (WAC), access information in response to a request to initiate a first connection between a subscriber and a wireless access point (WAP), the first connection using a first network protocol;
   determining, at the WAC based on the access information, that the subscriber has enhanced Quality of Service (QoS) privileges;
   in response to determining that the subscriber has enhanced QoS privileges, assign, based on the determining, subscriber traffic to a second connection between the WAP and the WAC, the second connection using a first pair of port numbers and using a second network protocol different from the first network protocol, wherein the WAC commands the WAP to use the first pair of port numbers to dynamically create the second connection; and
   initiating a dynamic service flow based on the pair of port numbers associated with the subscriber traffic, wherein the dynamic service flow is defined by a source network address, a source port address, a destination network address, and a destination port address.

8. The method of claim 7, wherein the second connection includes a data over cable service interface specification (DOCSIS) network.

9. The method of claim 7, wherein the second network protocol utilizes a tunneling protocol.

10. The method of claim 9, wherein the tunneling protocol is the control and provisioning of wireless access points (CAPWAP) protocol.

11. The method of claim 7, wherein the first pair of port numbers and the second pair of port numbers comprise user datagram protocol (UDP) ports associated with the WAP.

12. The method of claim 7, wherein the first network protocol is selected from the group consisting of IEEE 802.11a, IEEE 802.11b, IEEE 802.11g, and IEEE 802.11n.

13. A non-transitory computer readable medium comprising logic operable, when executed by a processor, to:
   receive, at a wireless access controller (WAC), access information in response to a request to initiate a first connection between a subscriber and a wireless access point (WAP) using a first network protocol; and
   determine, at the WAC based on the access information, whether the subscriber has enhanced Quality of Service (QoS) privileges;
   in response to determining the subscriber has enhanced QoS privileges, assign subscriber traffic to a second connection between the WAP and the WAC, the second connection using a first pair of port numbers and using a second network protocol different from the first network protocol, wherein the WAC commands the WAP to use the first pair of port numbers to dynamically create the second connection;
   in response to determining the subscriber does not have enhanced QoS privileges, assign subscriber traffic to a third connection, the third connection using a second pair of port numbers and the second network protocol; and
   initiate a dynamic service flow based on the pair of port numbers associated with the subscriber traffic, wherein the dynamic service flow is defined by a source network address, a source port address, a destination network address, and a destination port address.

14. The computer readable medium of claim 13, wherein the second connection includes a data over cable service interface specification (DOCSIS) network.

15. The computer readable medium of claim 13, wherein the second network protocol utilizes a tunneling protocol.

16. The computer readable medium of claim 15, wherein the tunneling protocol is the control and provisioning of wireless access points (CAPWAP) protocol.

17. The computer readable medium of claim 13, wherein the first pair of port numbers and the second pair of port numbers comprise user datagram protocol (UDP) ports associated with the WAP.

18. The computer readable medium of claim 13, wherein the first network protocol is selected from the group consisting of IEEE 802.11a, IEEE 802.11b, IEEE 802.11g, and IEEE 802.11n.

* * * * *